(12) United States Patent
Pompei (10) Patent No.: US 10,856,084 B2
(45) Date of Patent: Dec. 1, 2020

(54) ULTRASONIC TRANSDUCER WITH TENSIONED FILM

(71) Applicant: Frank Joseph Pompei, Wayland, MA (US)

(72) Inventor: Frank Joseph Pompei, Wayland, MA (US)

( * ) Notice: Subject to any disclaimer, the term of this patent is extended or adjusted under 35 U.S.C. 154(b) by 0 days.

(21) Appl. No.: 16/081,261

(22) PCT Filed: Mar. 2, 2017

(86) PCT No.: PCT/US2017/020386
§ 371 (c)(1),
(2) Date: Aug. 30, 2018

(87) PCT Pub. No.: WO2017/151878
PCT Pub. Date: Sep. 8, 2017

(65) Prior Publication Data
US 2019/0098413 A1 Mar. 28, 2019

Related U.S. Application Data (60) Provisional application No. 62/303,697, filed on Mar. 4, 2016.

(51) Int. Cl.
*H04R 19/00* (2006.01)
*H04R 7/24* (2006.01)
(Continued)

(52) U.S. Cl.
CPC .............. *H04R 7/24* (2013.01); *B06B 1/0688* (2013.01); *G01H 11/06* (2013.01); *H04R 19/00* (2013.01)

(58) Field of Classification Search
CPC ... H04R 7/16; H04R 7/18; H04R 7/20; H04R 7/22; H04R 7/24; H04R 19/00;
(Continued)

(56) References Cited

U.S. PATENT DOCUMENTS

| 4,046,974 A | 9/1977 | Baumhauer, Jr. et al. |
| 4,081,626 A | 3/1978 | Muggli et al. |

(Continued)

FOREIGN PATENT DOCUMENTS

| JP | 2001359188 A | 12/2001 |
| WO | 20130188514 A2 | 12/2013 |

*Primary Examiner* — Md S Elahee
(74) *Attorney, Agent, or Firm* — BainwoodHuang (57) ABSTRACT

Ultrasonic transducers that include backplates with a plurality of linear physical features formed on surfaces thereof and vibrator films tensioned in a specified manner for improved transducer performance. An ultrasonic transducer includes a backplate, a vibrator film, and a compliant member. The backplate includes the plurality of linear physical features formed parallel to one another on the backplate surface. The vibrator film has a metallized side and a non-metallized side, and is positioned proximate to the backplate such that its non-metallized side faces the linear physical features on the backplate surface. The compliant member applies a spring force to the vibrator film for urging the vibrator film against the backplate surface, while maintaining a constant, consistent, and uniform tension in the vibrator film in substantially one direction, preferably perpendicular to the linear physical features along the backplate surface.

15 Claims, 5 Drawing Sheets

(51) Int. Cl.
*G01H 11/06* (2006.01)
*B06B 1/06* (2006.01)

(58) Field of Classification Search
CPC .. H04R 19/013; H04R 19/02; H04R 2400/11; B06B 1/0688; G01H 11/06
USPC .................. 381/163, 174, 398, 423; 367/181
See application file for complete search history.

(56) References Cited

U.S. PATENT DOCUMENTS

| | | | |
|---|---|---|---|
| 4,311,881 A * | 1/1982 | Reynard | B65D 39/12 381/163 |
| 4,384,394 A | 5/1983 | Lemonon et al. | |
| 4,980,873 A | 12/1990 | Gross et al. | |
| 6,108,880 A * | 8/2000 | Takeuchi | B41J 2/161 29/25.35 |
| 6,577,742 B1 * | 6/2003 | Bruney | H04R 7/16 181/171 |
| 2001/0007591 A1 | 7/2001 | Pompei | |
| 2003/0091200 A1 * | 5/2003 | Pompei | B06B 1/0292 381/77 |
| 2004/0022409 A1 * | 2/2004 | Hutt | H04R 31/006 381/423 |
| 2008/0285777 A1 * | 11/2008 | Pompei | B06B 1/0292 381/116 |

* cited by examiner

ULTRASONIC TRANSDUCER WITH TENSIONED FILM

CROSS-REFERENCE TO RELATED APPLICATIONS

This application claims benefit of the priority of International Patent Application No. PCT/US2017/020386 filed Mar. 2, 2017 entitled ULTRASONIC TRANSDUCER WITH TENSIONED FILM, which claims benefit of the priority of U.S. Provisional Patent Application No. 62/303,697 filed Mar. 4, 2016 entitled ULTRASONIC TRANSDUCER WITH TENSIONED FILM.

TECHNICAL FIELD

The present application relates generally to ultrasonic transducers, and more specifically to ultrasonic transducers that include backplates with a plurality of linear physical features formed on surfaces thereof and vibrator films that are tensioned in a specified manner for improved transducer performance.

BACKGROUND

Ultrasonic transducers are known that employ backplates and vibrator films for generating compression waves at sonic or ultrasonic frequencies in a transmission mode, as well as for receiving acoustic waves for subsequent conversion to voltage waveforms in a reception mode. A conventional ultrasonic transducer can include an inner ring, a circular grooved backplate, a vibrator film, a retainer, and a housing. The vibrator film can have a metallized side and a non-metallized side, and can cover the circular grooved backplate such that its non-metallized side is against the circular grooves of the backplate. The circular grooved backplate covered by the vibrator film can be placed within the inner ring. The retainer such as a leaf spring can be configured to push the circular grooved backplate against the vibrator film within the inner ring to form an ultrasonic transducer assembly. The housing is configured to house the ultrasonic transducer assembly. The circular grooved backplate, which can be conductive, forms a first electrode of the ultrasonic transducer assembly, and the metallized side of the vibrator film forms a second electrode of the ultrasonic transducer assembly.

In such a conventional ultrasonic transducer, the circular grooved backplate and the vibrator film act as an emitter in the transmission mode, as well as a sensor in the reception mode. In the transmission mode, the compression waves can be generated by placing an alternating current (AC) voltage across the backplate and the vibrator film, causing the vibrator film to vibrate at the frequency of the AC voltage. The resulting vibrations of the vibrator film can generate sonic or ultrasonic waves that can propagate through the air. Such a conventional ultrasonic transducer is commonly known as a Sell-type transducer.

SUMMARY

In accordance with the present application, ultrasonic transducers are disclosed that include backplates with a plurality of linear physical features formed on surfaces thereof and vibrator films that are tensioned in a specified manner for improved transducer performance. In one aspect, an ultrasonic transducer includes a backplate, a vibrator film, and a compliant member such as a spring. The backplate can have a rectangular, square, hexagonal, or any other suitable geometric polygon shape, optionally with rounded corners, or a circular or oval shape. The backplate can be made of metal, an insulative material coated with metal, or any other suitable material(s). The backplate includes a plurality of linear physical features formed on a surface thereof. The plurality of linear physical features can be configured as elongated grooves or any other suitable linear configuration. In an exemplary aspect, the plurality of linear physical features can be formed parallel to one another on the surface of the backplate, and can be disposed on the backplate surface such that they are perpendicular to at least one side of the backplate. The vibrator film has a metallized side and a non-metallized side. The vibrator film is positioned proximate to the backplate such that its non-metallized side faces the plurality of linear physical features on the backplate surface. The compliant member is configured to apply a spring force to the vibrator film for urging the vibrator film against the backplate surface, while maintaining a constant, consistent, and uniform tension in the vibrator film in substantially one direction, preferably perpendicular to the plurality of linear physical features along the backplate surface.

In a further exemplary aspect, the backplate forms a first electrode of the ultrasonic transducer, and the metallized side of the vibrator film forms a second electrode of the ultrasonic transducer. The ultrasonic transducer is configured to allow a voltage such as an alternating current (AC) voltage to be applied across the first electrode and the second electrode for generating an electric field between the backplate and the vibrator film, causing the vibrator film to be attracted to the backplate. Because the applied voltage is an AC voltage, the resulting electric field causes the vibrator film to vibrate against the backplate surface at the frequency of the AC voltage, thereby generating compression waves at sonic or ultrasonic frequencies that can correspond to a signal waveform in a transmission mode of the ultrasonic transducer. Incoming acoustic waves can also cause the vibrator film to vibrate, and the vibrations of the vibrator film against the backplate surface can be converted to a corresponding voltage waveform in a reception mode of the ultrasonic transducer.

In both the transmission mode and the reception mode of the ultrasonic transducer, patterns of vibrating and/or non-vibrating areas of the vibrator film occur primarily in the direction perpendicular to the plurality of linear physical features on the backplate surface, while the vibrator film motion is mostly uniform along the direction of the plurality of linear physical features. Taking into account such patterns of vibrating and/or nonvibrating areas of the vibrator film, enhanced vibration uniformity of the vibrator film can be achieved by maintaining a constant, consistent, and uniform tension in the vibrator film in substantially one direction, preferably perpendicular to the plurality of linear physical features along the backplate surface. In this way, the overall performance of the ultrasonic transducer can be improved.

Other features, functions, and aspects of the present application will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

The disclosures of International Patent Application No. PCT/US2017/020386 filed Mar. 2, 2017 entitled ULTRASONIC TRANSDUCER WITH TENSIONED FILM, and U.S. Provisional Patent Application No. 62/303,697 filed Mar. 4, 2016 entitled ULTRASONIC TRANSDUCER WITH TENSIONED FILM, are hereby incorporated herein by reference in their entirety.

Ultrasonic transducers are disclosed that include backplates with a plurality of linear physical features formed on surfaces thereof and vibrator films that are tensioned in a specified manner for improved transducer performance. One such ultrasonic transducer includes a backplate, a vibrator film, and a compliant member such as a spring. The backplate can include a plurality of linear physical features such as elongated grooves formed parallel to one another on a surface of the backplate. The plurality of linear physical features can be disposed on the backplate surface such that they are perpendicular to at least one side of the backplate. The vibrator film has a metallized side and a non-metallized side. The vibrator film is positioned proximate to the backplate such that its non-metallized side faces the plurality of linear physical features on the backplate surface. The compliant member is configured to apply a spring force to the vibrator film for urging the vibrator film against the backplate surface, while maintaining a constant, consistent, and uniform tension in the vibrator film in substantially one direction, preferably perpendicular to the plurality of linear physical features along the backplate surface.

The disclosed ultrasonic transducers can avoid at least some of the drawbacks found in conventional ultrasonic transducers. For example, in a Sell-type transducer that typically includes a vibrator film and a circular grooved backplate, a uniform radially symmetric tension can generally be maintained in the vibrator film by pressing the vibrator film against the circular grooved backplate. However, in conventional ultrasonic transducers that include rectangular, square, hexagonal, or other non-circular backplates, merely pressing the vibrator film against the backplate can cause the resulting tension in the vibrator film to be non-uniform or uneven. For example, in a conventional ultrasonic transducer that includes a rectangular or square backplate, areas of such non-uniform or uneven tension in a vibrator film 112 (see FIG. 1b) can develop and extend along the diagonal dimensions 114 of the vibrator film 112, causing those areas of the vibrator film 112 to be characterized by having poor performance, out-of-phase motion, as well as "dead spots." As a result, a significant amount of the area of the vibrator film 112 can become unavailable for successfully transmitting outgoing ultrasonic waves and/or receiving incoming acoustic waves.

In the disclosed ultrasonic transducers, particularly those that include non-circular backplates with linear physical surface features such as elongated grooves, it has been recognized that patterns of vibrating and/or nonvibrating areas of the vibrator films occur primarily in the direction perpendicular to the linear physical surface features of the backplates. It has been further recognized that, by maintaining a constant, consistent, and uniform tension in the vibrator films in substantially one direction, preferably perpendicular to the linear physical surface features of the backplates, enhanced vibration uniformity of the vibrator films can be achieved. In this way, the poor performance, out-of-phase motion, and/or dead spots that frequently characterize the vibrator films of conventional ultrasonic transducers with polygon-shaped backplates can be substantially avoided.

Figure 1A:
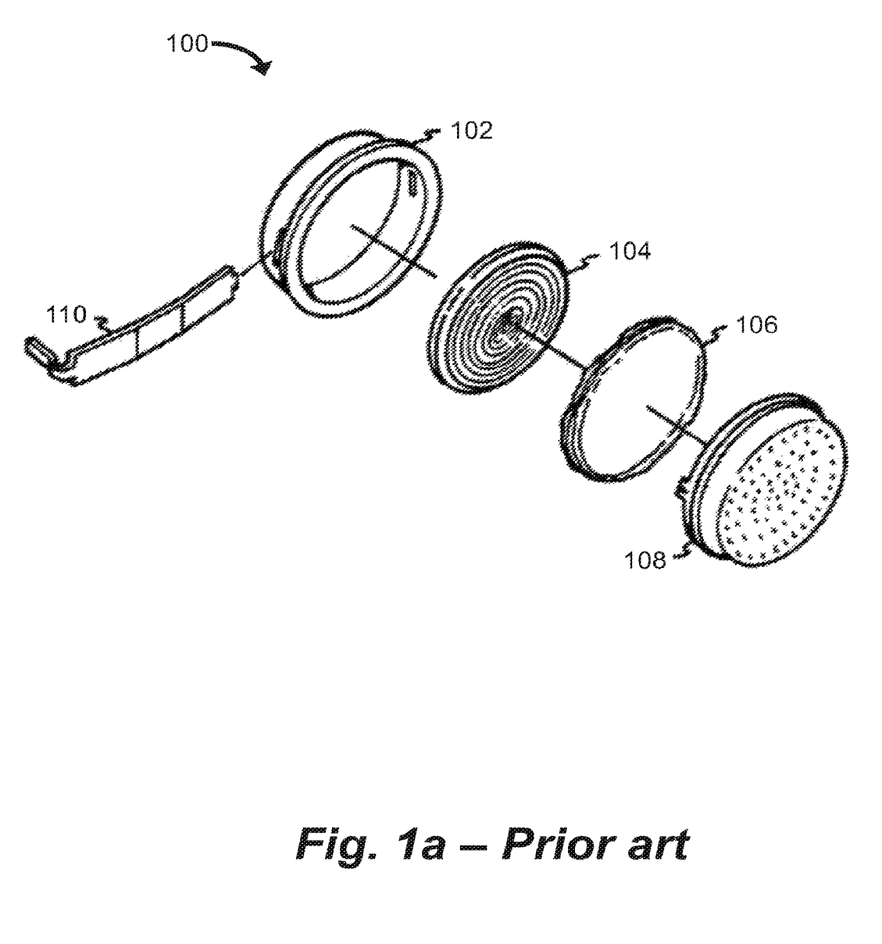
FIG. 1a is an exploded perspective view of a conventional ultrasonic transducer that includes a circular grooved backplate.
Figure 1B:
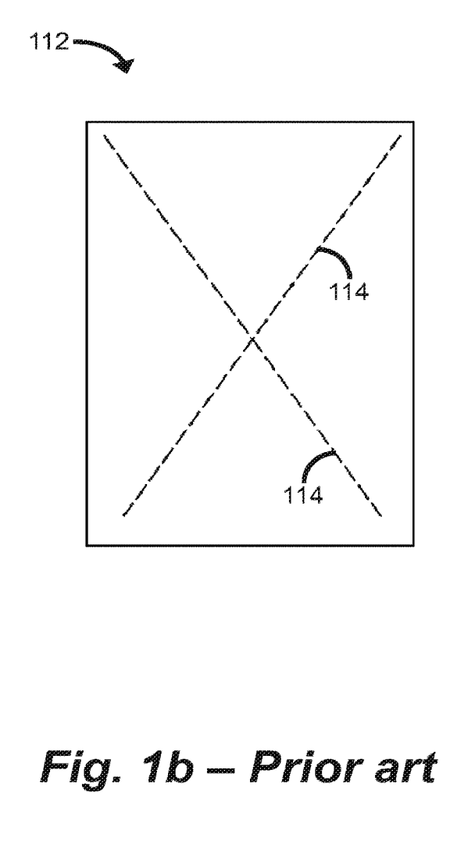
FIG. 1b depicts a vibrator film employed in a conventional ultrasonic transducer that includes a rectangular backplate.

FIG. 1a depicts an exemplary embodiment of a conventional ultrasonic transducer 100. As shown in FIG. 1a, the conventional ultrasonic transducer 100 includes an inner ring 102, a circular grooved backplate 104, a vibrator film 106, a retainer 110, and a housing 108. The vibrator film 106 has a metallized side and a non-metallized side. The vibrator film 106 can cover the circular grooved backplate 104 such that its non-metallized side is against the circular grooves of the backplate 104. The circular grooved backplate 104 covered by the vibrator film 106 can be placed within the inner ring 102. The retainer 110 such as a leaf spring is configured to press the otherwise loose circular grooved backplate 104 against the vibrator film 106 within the inner ring 102 to form an ultrasonic transducer assembly. The housing 108 is configured to house the ultrasonic transducer assembly. The circular grooved backplate 104, which can be conductive, forms a first electrode of the ultrasonic transducer 100, and the metallized side of the vibrator film 106 forms a second electrode of the ultrasonic transducer 100.

In the conventional ultrasonic transducer 100 of FIG. 1a, the circular grooved backplate 104 and the vibrator film 106 act as an emitter in a transmission mode, and as a sensor in a reception mode. In the transmission mode, compression waves can be generated by placing an alternating current (AC) voltage across the backplate 104 and the vibrator film 106, causing the vibrator film 106 to vibrate at the frequency of the AC voltage. The resulting vibrations of the vibrator film 106 against the circular grooved backplate 104 can generate sonic or ultrasonic waves that can propagate through the air. The conventional ultrasonic transducer 100 is commonly known as a Sell-type transducer.

Figure 2:
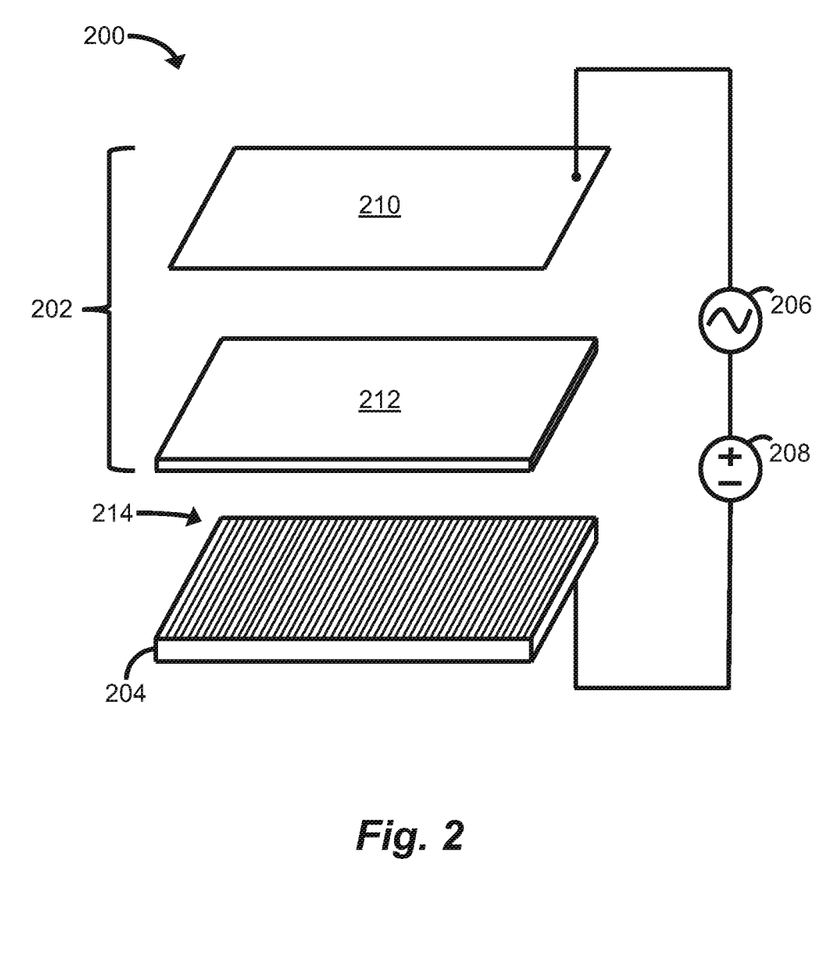
FIG. 2 is an exploded perspective view of an exemplary ultrasonic transducer, in accordance with the present application.

FIG. 2 depicts an exemplary ultrasonic transducer 200, in accordance with the present application. As shown in FIG. 2, the ultrasonic transducer 200 can include a vibrator film layer 202 (also referred to herein as the "vibrator film") and a backplate 204. The vibrator film 202 can include a membrane film 212 that has a conductive surface 210. The grooved backplate 204 can include a plurality of linear physical features 214 such as elongated grooves formed on a surface of the backplate 204. In one embodiment, such elongated grooves on the backplate surface can be implemented as piecewise linear grooves or staggered grooves. The membrane film 212 can be implemented by a thin (e.g., about 0.2-100.0 μm, typically about 8 μm, in thickness) polyimide, polyester, polyvinylidene fluoride (PVDF), polyethylene terephthalate (PET), polytetrafluoroethylene (PTFE) film, or any other suitable polymeric or non-polymeric film. Further, the conductive surface 210 of the membrane film 212 can be implemented by a coating of aluminum, gold, nickel, or any other suitable conductive metal or material. In addition, the grooved backplate 204 can be made of (or coated with) aluminum or any other suitable conductive metal or material, and the plurality of linear physical features 214 (e.g., the elongated grooves) can have any suitable size and/or linear geometric shape.

As shown in FIG. 2, a DC bias source 208 (e.g., 150 VDC) can be connected across the conductive surface 210 of the membrane film 212 (which forms a first electrode of the ultrasonic transducer 200) and a conductive surface of the backplate 204 (which forms a second electrode of the ultrasonic transducer 200). The DC bias source 208 can be used to increase the sensitivity of the ultrasonic transducer 200, as well as to reduce unwanted distortion in acoustic waves emitted by the ultrasonic transducer 200. In one embodiment, the membrane film 212 can have electret properties, allowing the vibrator film 202 to function as a DC bias source in place of the DC bias source 208.

It is noted that, in FIG. 2, a time-varying signal is generated by an AC signal source 206, which is connected in series with the DC bias source 126 such that the resulting voltage delivered across the first and second electrodes of the ultrasonic transducer 200 is a sum of DC and AC components. In one embodiment, the time-varying signal can be an ultrasonic carrier signal modulated with a processed audio signal. For example, in a parametric audio system, a driver amplifier can amplify the modulated ultrasonic carrier signal, and an array of acoustic transducers can project the modulated and amplified ultrasonic carrier signal through the air along a selected projection path to regenerate the audio signal.

Figure 2A:
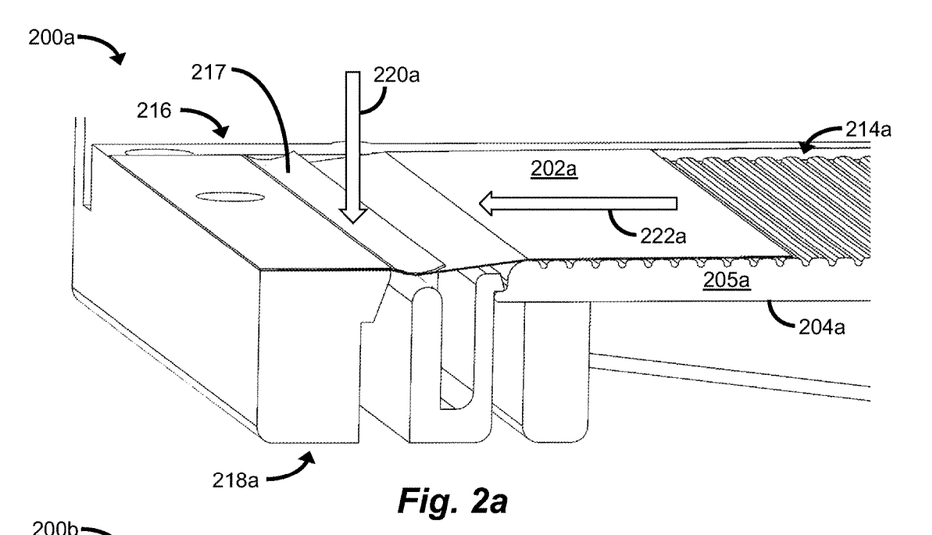
FIG. 2a is a detailed perspective, cross-sectional view of a backplate, a vibrator film, and a compliant member included in the ultrasonic transducer of FIG. 2.

FIG. 2a depicts a detailed perspective, cross-sectional view of a first illustrative embodiment 200a of the ultrasonic transducer 200 of FIG. 2. As shown in FIG. 2a, the first illustrative embodiment 200a of the ultrasonic transducer 200 includes a vibrator film 202a and a backplate 204a. Like the vibrator film 200 (see FIG. 2), the vibrator film 202a can include a membrane film having a conductive surface, which forms a first electrode of the first illustrative embodiment 200a of the ultrasonic transducer 200. The backplate 204a can include a plurality of linear physical features 214a such as elongated grooves formed on a surface of the backplate 204a. Further, the backplate 204a can be made of (or coated with) aluminum or any other suitable conductive metal or material to form a second electrode of the first illustrative embodiment 200a of the ultrasonic transducer 200. The vibrator film 202a is positioned proximate to the backplate 204a such that its conductive surface faces away from the plurality of linear physical features 214a on the backplate surface. It is noted that, in FIG. 2a, just a portion of the vibrator film 202a is shown so as to expose some of the plurality of linear physical features 214a on the surface of the backplate 204a. It should be understood, however, that the vibrator film 202a can be extended to cover the entire surface of the backplate 204a.

As further shown in FIG. 2a, the plurality of linear physical features 214a are formed substantially parallel to one another on the surface of the backplate 204a. Further, the plurality of linear physical features 214a are disposed on the backplate surface such that they are perpendicular to at least one side of the backplate 204a, such as the side of the backplate 204a corresponding to reference numeral 205a. The first illustrative embodiment 200a of the ultrasonic transducer 200 further includes a compliant member 216 (such as a leaf spring or any other suitable spring) configured to apply a known spring force 220a to the vibrator film 202a substantially in the direction perpendicular to the surface of the backplate 204a for urging the vibrator film 202a against the backplate 204a, while maintaining a constant, consistent, and uniform tension in the vibrator film 202a in substantially one direction 222a, preferably perpendicular to the plurality of linear physical features 214a along the surface of the backplate 204a.

It is noted that the size and/or linear geometric shape of the plurality of linear physical features 214 on the surface of the backplate 204, the type and/or thickness of the vibrator film 202, the amount of tension maintained in the vibrator film 202, etc., can be factors in determining a frequency response of the ultrasonic transducer 200. It is further noted that the tension maintained in the vibrator film 202 can provide a restoring force for vibrator film motion during operation of the ultrasonic transducer 200.

In the first illustrative embodiment 200a of the ultrasonic transducer 200, the backplate 204a can be snapped onto or otherwise mechanically coupled to a frame 218a of the ultrasonic transducer assembly, so that the backplate 204a is rigidly held by or mounted to the frame 218a. In the conventional ultrasonic transducer 100 (see FIG. 1a), the vibrator film 106 is rigidly mounted to the inner ring and housing 102, 108, while the circular grooved backplate 104 is urged into contact with the vibrator film 106 via the retainer 110. This conventional approach is generally acceptable for small transducers, as the mass of the circular grooved backplate 104 is typically insufficient to break the vibrator film 106 in the event the ultrasonic transducer 100 is dropped. However, because mass increases with the square of the backplate diameter, while the strength of the vibrator film goes roughly linearly with its diameter, larger backplates tend to break the vibrator film when the ultrasonic transducer assembly is dropped or subjected to mechanical shock.

To remedy this, the relatively heavier backplate 204a (compared to the circular grooved backplate 104; see FIG. 1a) is rigidly mounted to the frame 218a, while the vibrator film 202a is free to slide, stretch, and/or flex slightly under spring force to maintain the vibrator film tension. Because the backplate 204a is rigidly attached to the frame 218a, it can move as one piece with the frame 218a, reducing the chance of damaging the vibrator film 202a when subjected to mechanical shock.

Further, the vibrator film 202a can be draped across the surface of the backplate 204a to cover the plurality of linear physical features 214a on the backplate surface. One end of the vibrator film 202a can be positioned between the compliant member 216 and the frame 218a, and the compliant member 216 can then be attached to the frame 218a, thereby fastening that end of the vibrator film 202a to the frame 218a. The opposite end of the vibrator film 202a can be fastened to an opposing portion of the frame 218a in any suitable fashion to secure the vibrator film 202a across the surface of the backplate 204a. By configuring the frame 218a of the ultrasonic transducer assembly to rigidly hold the backplate 204a, while allowing some movement in the vibrator film 202a draped across the backplate surface, potential damage to the vibrator film 202a, resulting from the inertia of the backplate 204a generated from the ultrasonic transducer assembly striking a hard surface, can be avoided.

As shown in FIG. 2a, the compliant member 216 has a curved surface portion 217 that, in response to the known spring force 220a, can press into the vibrator film 202a to generate the constant and consistent tension in the vibrator film 202a in the direction 222a substantially perpendicular to the plurality of linear physical features 214a along the backplate surface. Electrical connections (not shown) can be made in any suitable fashion to the first electrode formed by the conductive surface of the vibrator film 202a, as well as to the second electrode formed by the conductive backplate 204a. In one embodiment, the compliant member 216 can be made of metal or any other suitable electrically conductive material to provide a point of electrical connection to the first electrode of the vibrator film 202a attached thereto. In the first illustrative embodiment 200a of the ultrasonic transducer 200, the vibrator film 202a can be made wider than the surface of the backplate 204a to avoid electrical arcing and/or shorting of conductive edges of the vibrator film 202a to a conductive surface of the backplate 204a.

Figure 2B:
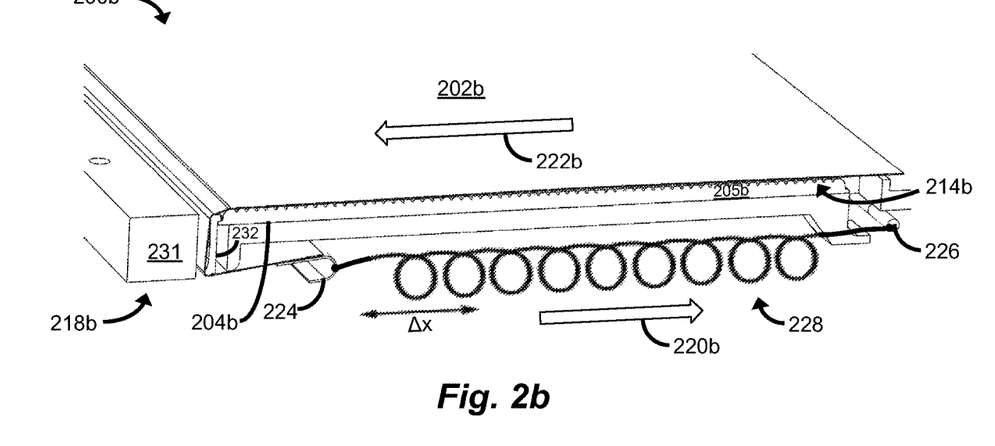
FIG. 2b is a detailed perspective, cross-sectional view of a backplate, a vibrator film, and a compliant member included in an alternative embodiment of the ultrasonic transducer of FIG. 2.

FIG. 2b depicts a detailed perspective, cross-sectional view of a second illustrative embodiment 200b of the ultrasonic transducer 200 of FIG. 2. As shown in FIG. 2b, the second illustrative embodiment 200b of the ultrasonic transducer 200 includes a vibrator film 202b and a backplate 204b. Like the vibrator film 200 (see FIG. 2), the vibrator film 202b can include a membrane film having a conductive surface, which forms a first electrode of the second illustrative embodiment 200b of the ultrasonic transducer 200. The backplate 204b can include a plurality of linear physical features 214b such as elongated grooves formed on a surface of the backplate 204b. Further, the backplate 204b can be made of (or coated with) aluminum or any other suitable conductive metal or material to form a second electrode of the second illustrative embodiment 200b of the ultrasonic transducer 200. The vibrator film 202b is positioned proximate to the backplate 204b such that its conductive surface faces away from the plurality of linear physical features 214b on the conductive backplate surface.

In the second illustrative embodiment 200b of the ultrasonic transducer 200, the plurality of linear physical features 214b are formed substantially parallel to one another on the surface of the backplate 204b. Further, the plurality of linear physical features 214b are disposed on the backplate surface such that they are perpendicular to at least one side of the backplate 204b, such as the side of the backplate 204b corresponding to reference numeral 205b. The second illustrative embodiment 200b of the ultrasonic transducer 200 further includes a U-shaped retainer element 224 (or any other suitably shaped retainer element) to which the vibrator film 202b can be attached, as well as a spring 228 (such as a coil spring, a wire spring, a leaf spring, or any other suitable spring) coupled between the retainer element 224 and a portion of a frame 218b of the ultrasonic transducer assembly, such as a post 226. It is noted that the general depiction of the spring 228 in FIG. 2b is provided for illustrative purposes only.

As shown in FIG. 2b, the vibrator film 202b can be positioned proximate to the grooved surface of the backplate 204b such that a portion of the vibrator film 202b extends through a slot between opposing portions 231, 232 of the frame 218b for ultimate attachment to the retainer element 224, which is disposed on a side of the backplate 204b opposite the grooved backplate surface. The spring 228 coupled between the retainer element 224 and the post 226 is configured to apply a known spring force 220b to the retainer element 224 for urging the vibrator film 202b attached thereto against the backplate 204b, while maintaining a constant, consistent, and uniform tension in the vibrator film 202b in substantially one direction 222b, preferably perpendicular to the plurality of linear physical features 214b (e.g., the elongated grooves) along the surface of the backplate 204b.

In the second illustrative embodiment 200b of the ultrasonic transducer 200, the backplate 204b can be snapped onto or otherwise mechanically coupled to the frame 218b of the ultrasonic transducer assembly, so that the backplate 204b is rigidly held by the frame 218b. Further, the vibrator film 202b can be draped across the surface of the backplate 204b to cover the plurality of linear physical features 214b on the backplate surface. As described herein, one end of the vibrator film 202b can be attached to the retainer element 224, while the opposite end of the vibrator film 202b can be fastened to the frame 218b in any suitable fashion to secure the vibrator film 202b across the surface of the backplate 204b. By configuring the frame 218b of the ultrasonic transducer assembly to rigidly hold the backplate 204b, while allowing some movement in the vibrator film 202b draped across the backplate surface, potential damage to the vibrator film 202b, resulting from the inertia of the backplate 204b generated from the ultrasonic transducer assembly striking a hard surface, can be avoided.

Further, electrical connections (not shown) can be made in any suitable fashion to the first electrode formed by the conductive surface of the vibrator film 202b, as well as to the second electrode formed by the conductive backplate 204b. In one embodiment, the retainer element 224 can be made of metal or any other suitable electrically conductive material to provide a point of electrical connection to the first electrode of the vibrator film 202b attached thereto. As in the first illustrative embodiment 200a of the ultrasonic transducer 200, the vibrator film 202b of the second illustrative embodiment 200b can be made wider than the surface of the backplate 204b to avoid electrical arcing and/or shorting of conductive edges of the vibrator film 202b to a conductive surface of the backplate 204b.

As described herein, the spring 228 coupled between the retainer element 224 and the post 226 is configured to apply a known spring force 220b to the retainer element 224 for urging the vibrator film 202b attached thereto against the backplate 204b, while maintaining a constant and consistent tension in the vibrator film 202b regardless of temperature changes, film creep {i.e., permanent stretching), etc. The vibrator film 202b (as well as the vibrator film 202a; see FIG. 2a) is generally stiff, and therefore a small dimensional change(s) virtually anywhere in the ultrasonic transducer assembly can have a significant impact on the tension in the vibrator film 202b.

To maintain a constant and consistent tension in the vibrator film 202b despite such possible dimensional changes in the ultrasonic transducer assembly, the spring 228 is extended as long as possible between the retainer element 224 and the post 226. Per Hooke's law, the force, "F", needed to extend (or compress) a spring is proportional to the absolute spring displacement, "x". Therefore, in order to minimize changes in the magnitude of the force, F, any changes ($\Delta_x$) in the extension of the spring due to flexing of the ultrasonic transducer assembly, stretching of the vibrator film 202b, etc., are made as small as possible relative to the absolute spring displacement, x. In the second illustrative embodiment 200b, the nominal extended (or stretched) length of the spring 228 corresponds to the absolute spring displacement, x.

Accordingly, in the second illustrative embodiment 200b, the nominal extended (or stretched) length of the spring 228, x, is made as large as practically possible {i.e., the magnitude of $\Delta\chi/\chi$ is kept as small as possible), allowing the spring 228 to be maintained in a stretched configuration during use. Similarly, in the first illustrative embodiment 200a, the force needed to flex the leaf spring 216 is proportional to the absolute leaf spring displacement. Therefore, in order to minimize changes in the magnitude of the force needed to flex the leaf spring, any changes in the absolute displacement of the leaf spring due to flexing of the ultrasonic transducer assembly, stretching of the vibrator film 202a, etc., are made as small as possible relative to the absolute leaf spring displacement.

Figure 3A:
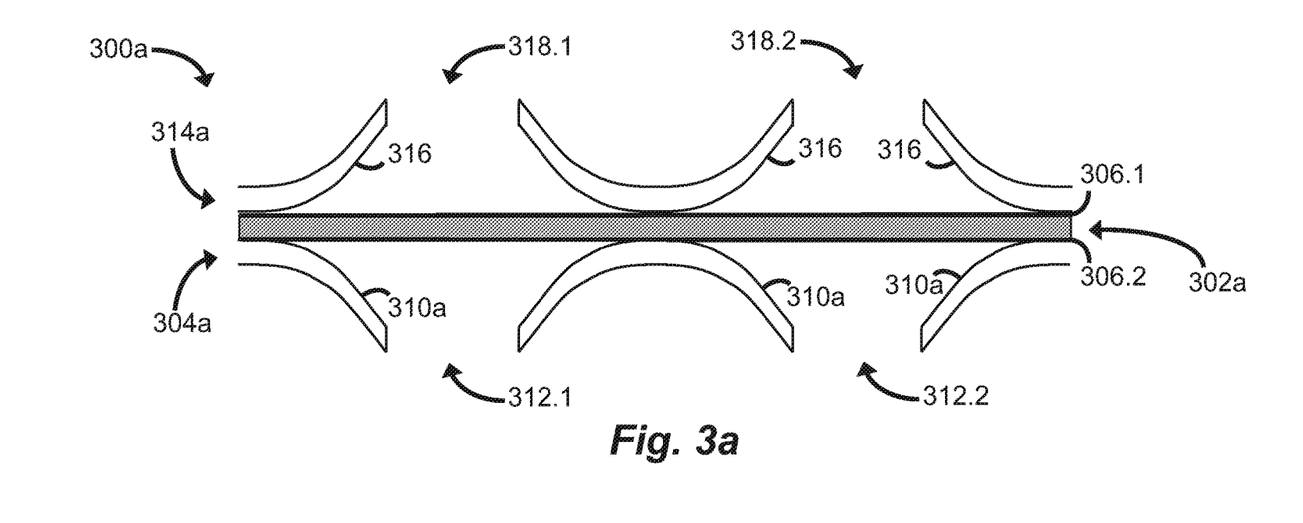
FIG. 3a is a cross-sectional view of another exemplary ultrasonic transducer, including a vibrator film having two opposing conductive surfaces, and two perforated backplates, each conductive surface of the vibrator film being positioned adjacent or proximate to a respective one of the perforated backplates, thereby providing a two-way driving configuration of the ultrasonic transducer.

Based on the various ultrasonic transducer configurations described herein, it is possible to provide a two-way driving configuration of an ultrasonic transducer. Such a two-way driving configuration is disclosed in International Patent Application No. PCT/US2016/053328 filed Sep. 23, 2016 entitled ULTRASONIC TRANSDUCERS, the disclosure of which is hereby incorporated herein by reference in its entirety. A cross-sectional view of such a two-way driving configuration is illustrated in FIG. 3a, which depicts an exemplary ultrasonic transducer 300a that includes a vibrator film 302a, a first perforated backplate 304a, and a second perforated backplate 314a. As shown in FIG. 3a, the vibrator film 302a has conductive surfaces 306.1, 306.2 on its opposing sides. The first perforated backplate 304a includes a surface 310a with a plurality of apertures, openings, or perforations 312.1, 312.2 formed thereon or therethrough. Likewise, the second perforated backplate 314a includes a surface 316 with a plurality of apertures, openings, or perforations 318.1, 318.2 formed thereon or therethrough. The conductive surface 306.1 of the vibrator film 302a is disposed against the surface 316 of the second perforated backplate 314a, and the conductive surface 306.2 of the vibrator film 302a is disposed against the surface 310a of the first backplate 304a. The first and second perforated backplates 304a, 314a can each be made of a conductive material such as aluminum and coated with a thin insulating material (e.g., a polymer, oxide). By applying a voltage difference (e.g., an AC voltage) between the conductive surface 306.2 of the vibrator film 302a and a conductive surface of the first perforated backplate 304a, and applying another voltage difference (e.g., an AC voltage) between the conductive surface 306.1 of the vibrator film 302a and a conductive surface of the second perforated backplate 314a, the vibrator film 302a can be made to move alternately in a first direction toward the first perforated backplate 304a and in a second direction toward the second perforated backplate 314a. As a result, the output capability of the ultrasonic transducer 300a in the two-way driving configuration can be increased up to at least two times the output capability of conventional ultrasonic transducers in known one-way driving configurations.

While the vibrator film 302a of the ultrasonic transducer 300a is disclosed herein as having two conductive surfaces 306.1, 306.2 on its opposing sides, the ultrasonic transducer 300a may alternatively be configured to include a vibrator film with a conductive surface on just one of its sides. Such an alternative configuration would avoid the need for an insulating coating on one of the backplates 304a, 314a. Electrically driving such ultrasonic transducers in the two-way driving configuration can be performed using any suitable combination of AC and DC voltages relative to the conductive surface(s) of the vibrator film and the conductive surface(s) of the backplate(s). Because an electrical force can be generated from voltage differences, each non-moveable conductive surface of a backplate can have a varying voltage relative to a corresponding conductive surface on a moveable vibrator film in order to produce vibrational motion. Such vibrational motion of the vibrator film can be increased or magnified by applying a DC bias voltage relative to the respective conductive surfaces of the vibrator film and the backplate. Moreover, the vibrator film or an insulating coating on the backplate(s) can have electret properties, and can be used to replace or augment the applied DC bias voltage.

In the ultrasonic transducer 300a (see FIG. 3a), one or more compliant members (e.g., like the compliant member 216; see FIG. 2a) or one or more springs (e.g., like the spring 228; see FIG. 2b) can be provided to apply a known spring force to the vibrator film 302a for urging the vibrator film 302a against one or both of the perforated backplates 304a, 314a, while maintaining a constant, consistent, and uniform tension in the vibrator film 302a in substantially one direction along the surface(s) of one or both of the perforated backplates 304a, 314a.

Figure 3B:
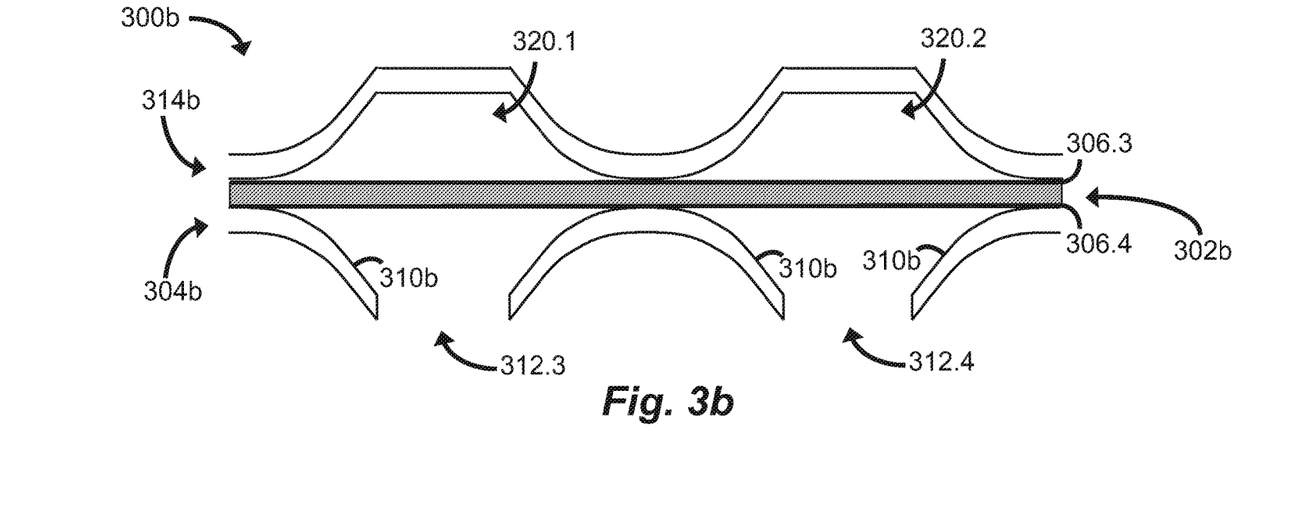
FIG. 3b is a cross-sectional view of an alternative embodiment of the ultrasonic transducer of FIG. 3a, in which one side of the two-way driving configuration is made to terminate at one or more chambers in order to provide a one-way output configuration with increased output drive capability.

It is noted that one side of the ultrasonic transducer 300a in the two-way driving configuration can be made to terminate at one or more chambers (e.g., one or more chambers 320.1, 320.2; see FIG. 3b) in order to provide an ultrasonic transducer 300b (see FIG. 3b) in a one-way output configuration with increased output drive capability. A cross-sectional view of the ultrasonic transducer 300b in the one-way output configuration is illustrated in FIG. 3b, which depicts a vibrator film 302b, a perforated backplate 304b, and a structure 314b that forms the plurality of chambers 320.1-320.2 for absorbing, redirecting, and/or reflecting output energy from a non-radiating side of the ultrasonic transducer 300b to a radiating side of the ultrasonic transducer 300b, or by acting as an acoustic compliance to provide a restoring force. As shown in FIG. 3b, the vibrator film 302b has conductive surfaces 306.3, 306.4 on its opposing sides. The perforated backplate 304b includes a surface 310b with a plurality of apertures, openings, or perforations 312.3, 312.4 formed thereon or therethrough. The conductive surface 306.3 of the vibrator film 302b is disposed against the surface of the structure 314b, and the conductive surface 306.4 of the vibrator film 302b is disposed against the surface 310b of the backplate 304b. For example, the structure 314b forming the plurality of chambers 320.1-320.2 may be made from any suitable conductive material, or any suitable non-conductive material, which, for example, may be molded from plastic or any other suitable malleable material. Further, the plurality of chambers 320.1-320.2 may be configured to be in registration or aligned with the plurality of apertures, openings, or perforations 312.3-312.4, respectively. During operation of the ultrasonic transducer 300b, output energy resulting from the vibrator film 302b being made to move in a direction toward the structure 314b can be redirected and/or reflected, by action of the plurality of chambers 320.1-320.2, toward the respective apertures, openings, or perforations 312.3, 312.4 in the perforated backplate 304b, thereby increasing the output drive capability of the ultrasonic transducer 300b beyond what was heretofore achievable in conventional ultrasonic transducers in known one-way driving configurations.

In the ultrasonic transducer 300b (see FIG. 3b), one or more compliant members (e.g., like the compliant member 216; see FIG. 2a) or one or more springs (e.g., like the spring 228; see FIG. 2b) can be provided to apply a known spring force to the vibrator film 302b for urging the vibrator film 302b against the perforated backplate 304b and/or the structure 314b, while maintaining a constant, consistent, and uniform tension in the vibrator film 302b in substantially one direction along the surface(s) of the perforated backplate 304b and/or the structure 314b.

It is noted that a DC bias voltage can be employed to magnify the electrical force of attraction causing the vibrator film 302a (see FIG. 3a) to move in the first direction toward the first perforated backplate 304a, as well as the electrical force of attraction causing the vibrator film 302a to move in the second direction toward the second perforated backplate 314a. Further, the apertures, openings, or perforations 312.1, 312.2, 318.1, 318.2 can each be circular, elongated, slotted, oval, or any other suitable shape for maximizing the performance of the ultrasonic transducer 300a. In one embodiment, some or all of the apertures, openings, or perforations 312.1, 312.2, 318.1, 318.2 can be flared like acoustic horns. In addition, the thin insulating material coating the respective first and second perforated backplates 304a, 314a can be implemented as either a thin polymer such as Mylar, urethane, acrylic, or any other suitable polymer, or an oxide such as iron oxide, aluminum oxide, or any other suitable oxide. It is further noted that the ultrasonic transducer designs described herein can be used in parametric audio systems or any other suitable systems and/or applications that employ sonic and/or ultrasonic transducers, for transmission and/or reception. Such ultrasonic transducer designs can be segmented for use with a phased array, or multiple discrete elements can be used in one ultrasonic transducer assembly for ruggedness and assembly convenience.

Figure 4:
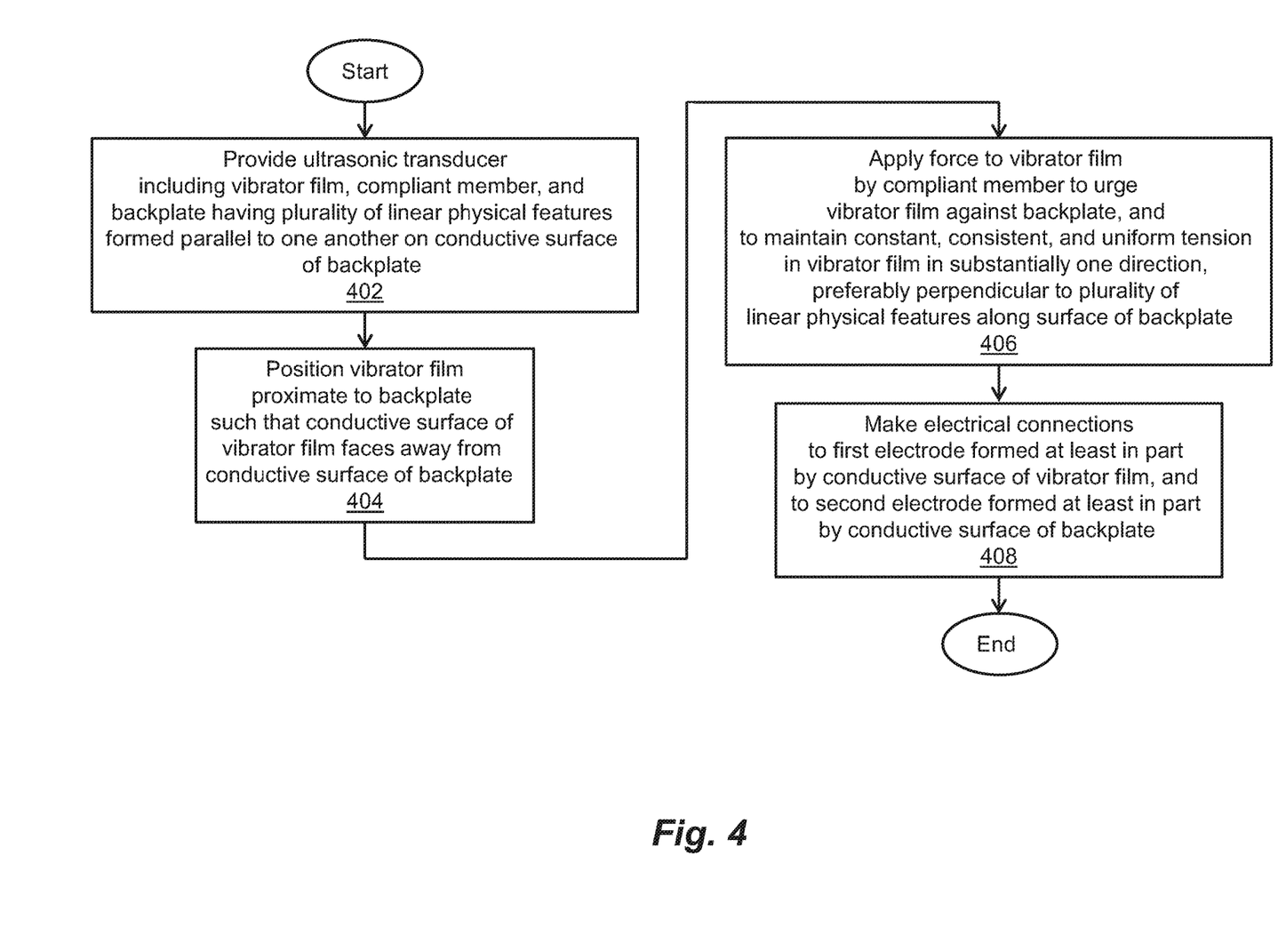
FIG. 4 is a flow diagram illustrating an exemplary method of manufacturing the ultrasonic transducer of FIG. 2.

A method of manufacturing the presently disclosed ultrasonic transducer is described herein with reference to FIG. 4. As depicted in block 402, an ultrasonic transducer is provided, including a vibrator film, a compliant member such as a spring, and a backplate having a plurality of linear physical features formed parallel to one another on a conductive surface of the backplate. As depicted in block 404, the vibrator film is positioned proximate to the backplate such that a conductive surface of the vibrator film faces away from the conductive surface of the backplate. As depicted in block 406, a force is applied to the vibrator film by the compliant member to urge the vibrator film against the backplate, and to maintain a constant, consistent, and uniform tension in the vibrator film in substantially one direction, preferably perpendicular to the plurality of linear physical features along the surface of the backplate. As depicted in block 408, electrical connections are made to a first electrode formed at least in part by the conductive surface of the vibrator film, and to a second electrode formed at least in part by the conductive surface of the backplate.

Having disclosed the above illustrative embodiments, other modifications to and/or variations of the disclosed embodiments can be made and/or practiced. For example, it was described herein with reference to the first illustrative embodiment 200a that the end of the vibrator film 202a not fastened to the frame 218a by the compliant member 216 can be fastened to the frame 218a in any suitable fashion to secure the vibrator film 202a across the surface of the backplate 204a. Alternatively, the first illustrative embodiment 200a can further include a second compliant member like the compliant member 216 for use in fastening the other end of the vibrator film 202a to the frame 218, as well as in applying a further known spring force to the vibrator film 202a for urging the vibrator film 202a against the backplate 204a and maintaining the constant and consistent tension in the vibrator film 202a.

It was further described herein with regard to the first and second illustrative embodiments 200a, 200b that the compliant member 216 and the spring 228 can maintain a constant, consistent, and uniform tension in the vibrator film 202a and the vibrator film 202b, respectively, in substantially one direction, preferably perpendicular to the plurality of linear physical features along the surface of the respective backplates 204a, 204b. Alternatively, the first and second illustrative embodiments 200a, 200b can each be configured to provide a further constant and consistent tension in the vibrator film in the direction parallel to the plurality of linear physical features along the surface of the backplate, thereby providing a constant and consistent tension in the vibrator film along two perpendicular axes along the backplate surface. Still alternatively, a constant and consistent tension in the vibrator film can be provided perpendicular to the plurality of linear physical features along the backplate surface, while a nominal tension can be provided parallel to the plurality of linear physical features along the backplate surface.

Moreover, the first and second illustrative embodiments 200a, 200b can each include several backplates, and employ a single vibrator film tensioned along one axis (or two axes) to operate in conjunction with the several backplates. In addition, the ultrasonic transducer assemblies of the first and second illustrative embodiments 200a, 200b can each be protected by a perforated screen mesh or protective cover. Because the first and second illustrative embodiments 200a, 200b each include a tensioned vibrator film that essentially eliminates the effects of film creep, such a perforated screen mesh or protective cover can be positioned within the ultrasonic transducer assembly, as desired and/or required, directly against the vibrator film. In addition, the ultrasonic transducer assemblies corresponding to the first and second illustrative embodiments 200a, 200b can each be configured to accommodate a phased array by dividing one or more conductive sections of the backplate into a plurality of array elements of any suitable geometric size and/or shape, in which each array element includes one or more linear physical features (e.g., elongated grooves) on a surface thereof. Each of the plurality of array elements of the phased array can be electrically isolated, such as at the "bottom" or deepest surfaces of the respective grooves where relatively little vibrational force is electrically generated. Such electrical isolation of an array element can alternatively be provided at the "top" or uppermost surfaces of the respective grooves, at the risk of possibly degrading some of the vibrational forces and/or sacrificing some of the transducer performance. Each of the plurality of array elements of the phased array can then be individually driven, as in a conventional linear phased array.

The first and second illustrative embodiments 200a, 200b can also include respective backplates having linear physical features (e.g., elongated grooves) that extend along two perpendicular axes (e.g., a grid of elongated grooves), and can be configured to provide a constant and consistent tension in their respective vibrator films along both of the perpendicular axes on the backplate surfaces. Such backplates can further have one or more electrically conductive pillar structures (e.g., T-shaped pillar structures), each extending from the deepest surface of a respective groove toward the vibrator film to allow an increased area of the electrode formed by the backplate to be closer to the vibrator film, thereby increasing the output power and/or sensitivity of the ultrasonic transducer.

It is noted that the conductive surfaces of vibrator films employed in ultrasonic transducers are typically implemented by a metal coating, which can have a mirror-like look in a completed ultrasonic transducer assembly. Users of such ultrasonic transducers often wish the mirror-like conductive surfaces of the vibrator films to be hidden, which is typically accomplished by covering the respective vibrator films with a protective perforated screen mesh or cover.

Rather than merely covering the conductive surface of a vibrator film with a protective perforated screen mesh or cover, a third illustrative embodiment of the ultrasonic transducer 200 can include a vibrator film having a conductive surface that can be colored, painted, printed, dyed, anodized, patterned, and/or decorated, while maintaining the electrical conductivity of the conductive surface. For example, such coloring, patterning, decorating, etc., of the conductive surface of the vibrator film can be performed using ink-jet printing or any other suitable printing. Further, as desired and/or required, a vibrator film having such a colored, patterned, decorated, etc., conductive surface can be used in conjunction with a perforated screen mesh or protective cover, which, in turn, can be provided with a corresponding and/or complementary color, pattern, decoration, etc., to present a coherent and aesthetically pleasing appearance to the ultrasonic transducer.

As described herein, the size and/or linear geometric shape of the plurality of linear physical features on the surface of the backplate, the type and/or thickness of the vibrator film, the amount of tension maintained in the vibrator film, etc., can be factors in determining the frequency response of an ultrasonic transducer. Another factor that can be determinative of the frequency response is the mass of the vibrator film, which can be affected by the amount (e.g., the thickness) of any paint, ink, dye, etc., used to color, pattern, decorate, etc., the conductive surface of the vibrator film. To compensate for the effect of such coloring, patterning, decorating, etc., which can lower the frequency range of the vibrator film, the tension in the vibrator film can be adjusted (e.g., increased), the size and/or linear geometric shape of the elongated grooves on the backplate surface can be modified (e.g., the grooves can be made smaller), and/or the frequency response of the ultrasonic transducer can be altered. It is understood that an area(s) of the conductive surface of the vibrator film where an electrical connection(s) is/are to be made should remain free from any paint, ink, dye, etc. {e.g., by masking and/or removing such paint, ink, dye, etc., from the area(s)) to assure the integrity of the electrical connection(s).

It should be appreciated that the terms and/or expressions employed herein are used as terms of description and not of limitation, and that there is no intention in the use of such terms and/or expressions of excluding any equivalents of the features shown and described and/or portions thereof.

It will be further appreciated by those of ordinary skill in the art that modifications to and variations of the above-described apparatus and methods may be made without departing from the inventive concepts disclosed herein. Accordingly, the present application should not be viewed as limited except as by the scope and spirit of the appended claims.

What is claimed is:

1. An ultrasonic transducer, comprising:
   a backplate having a plurality of linear physical features formed on a surface thereof,
   wherein the plurality of linear physical features are parallel to one another;
   a vibrator film positioned proximate to the backplate; and
   a compliant member configured to apply a force to the vibrator film to maintain a predetermined tension in the vibrator film,
   wherein the predetermined tension is configured to be directed along the surface of the backplate perpendicular to the plurality of linear physical features formed on the surface of the backplate and to provide a restoring force for the vibrator film motion during operation of the transducer.

2. The ultrasonic transducer of claim 1 wherein the vibrator film has a metallized side and a non-metallized side, and wherein the metallized side of the vibrator film is one of colored, painted, printed, dyed, and anodized to provide a predetermined pattern or decoration on the metallized side of the vibrator film.

3. The ultrasonic transducer of claim 2 further comprising:
   a protective cover having a surface with a complementary predetermined pattern or decoration thereon for presenting, in conjunction with the predetermined pattern or decoration on the metallized side of the vibrator film, a coherent appearance to the ultrasonic transducer.

4. The ultrasonic transducer of claim 2 wherein the metallized side of the vibrator film is printed using ink-jet printing to provide a predetermined pattern or decoration on the metallized side of the vibrator film.

5. The ultrasonic transducer of claim 1 wherein the compliant member is configured to apply the force to the vibrator film substantially in a direction perpendicular to the surface of the backplate.

6. The ultrasonic transducer of claim 5 wherein the compliant member includes a spring.

7. The ultrasonic transducer of claim 1 further comprising:
   a frame assembly,
   wherein a first end of the vibrator film is fastened to a first portion of the frame assembly.

8. The ultrasonic transducer of claim 7 wherein a first portion of the compliant member is configured to generate the force applied to the vibrator film.

9. The ultrasonic transducer of claim 8 wherein the compliant member has a curved surface portion configured, in response to the force generated by the first portion of the compliant member, to press into the vibrator film to generate the predetermined tension in the vibrator film.

10. The ultrasonic transducer of claim 8 wherein the first portion of the compliant member is a spring.

11. The ultrasonic transducer of claim 7 wherein an opposite end of the vibrator film is fastened to an opposing portion of the frame assembly to secure the vibrator film across the surface of the backplate, and wherein the compliant member is configured, in response to the applied force, to press into the vibrator film to generate the predetermined tension in the vibrator film.

12. The ultrasonic transducer of claim 1 further comprising:
   a frame assembly,
   wherein the backplate is rigidly mounted to the frame assembly.

13. A method of manufacturing an ultrasonic transducer, comprising:

providing a vibrator film, a compliant member, and a backplate having a plurality of linear physical features formed parallel to one another on a conductive surface of the backplate;

positioning the vibrator film proximate to the backplate such that a conductive surface of the vibrator film faces away from the conductive surface of the backplate;

configuring the compliant member to apply a force to the vibrator film to maintain a predetermined tension in the vibrator film in substantially one direction;

making a first electrical connection to a first electrode formed at least in part by the conductive surface of the vibrator film; and making a second electrical connection to a second electrode formed at least in part by the conductive surface of the backplate, wherein the configuring of the compliant member includes configuring the compliant member to apply the force to the vibrator film to maintain the predetermined tension in the vibrator film, the predetermined tension being configured to be directed along the surface of the backplate perpendicular to the plurality of linear physical features formed on the conductive surface of the backplate and providing a restoring force for the vibrator film motion during operation of the transducer.

14. The method of claim 13 further comprising:

performing one of coloring, painting, printing, dyeing, and anodizing a metallized side of the vibrator film to provide a predetermined pattern or decoration on the metallized side of the vibrator film.

15. The method of claim 13 further comprising:

providing a frame assembly; and rigidly mounting the backplate to the frame assembly.

\* \* \* \* \*